United States Patent

Sato

[11] Patent Number: 6,052,441
[45] Date of Patent: *Apr. 18, 2000

[54] VOICE RESPONSE SERVICE APPARATUS

[75] Inventor: Atsuko Sato, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/556,013

[22] Filed: Nov. 9, 1995

[30] Foreign Application Priority Data

Jan. 11, 1995 [JP] Japan .................................. 7-002614

[51] Int. Cl.⁷ .................................................. H04M 1/64
[52] U.S. Cl. ................................. 379/88.16; 379/88.22
[58] Field of Search ............................... 379/67, 88, 89, 379/111, 112, 113, 114, 115, 201, 67.1, 88.16, 88.17, 88.22, 88.23, 88.24; 395/2.79

[56] References Cited

U.S. PATENT DOCUMENTS

| | | | |
|---|---|---|---|
| 4,922,520 | 5/1990 | Bernard et al. | 379/88 |
| 4,942,616 | 7/1990 | Linstroth et al. | 381/51 |
| 4,989,233 | 1/1991 | Schakowsky et al. | 379/113 |
| 5,448,624 | 9/1995 | Hardy et al. | 379/67 |
| 5,533,103 | 7/1996 | Peavey et al. | 379/69 |
| 5,553,121 | 9/1996 | Martin et al. | 379/88 |
| 5,572,570 | 11/1996 | Kuenzig | 379/1 |
| 5,633,909 | 5/1997 | Fitch | 379/15 |
| 5,679,077 | 10/1997 | Pocock et al. | |
| 5,682,421 | 10/1997 | Glovitz et al. | 379/88 |

Primary Examiner—Scott Weaver
Attorney, Agent, or Firm—Staas & Halsey LLP

[57] ABSTRACT

A voice response service apparatus comprises a log data storage unit, an identification data input unit and a voice response reproduction unit. The log data storage unit stores contents of a plurality of processes executed in an interactive form with a user through voice responses in the form of log data showing a record of time transitions and also stores identification data for identifying each of the contents of the plurality of processes as a part of contents of the voice responses. The identification data input unit inputs the identification data stored in the log data storage unit. The voice response reproduction unit reads the contents of the interactive-form processes of the log data corresponding to the identification data inputted by the identification data input unit from the log data storage unit and reproduces the thus read process contents into voices.

17 Claims, 11 Drawing Sheets

FIG. 2

| | | | |
|---|---|---|---|
| 19940906153300 | LINE CONNECTION | ~100 | |
| 19940906153300 | SERVICE BRIEFING | ~101 | |
| 19940906153330 | USER'S NUMBER INPUT NARRATION | ~102 | |
| 19940906153341 | 6 | | |
| 19940906153341 | 5 | | |
| 19940906153342 | 1 | | |
| 19940906153342 | 1 | ~103 | (1) ONE USER'S UNIT ORDERING OF THREE PIECES OF GOODS (321) |
| 19940906153344 | 2 | | |
| 19940906153345 | 3 | | |
| 19940906153347 | CONFIRMATION OF USER'S NUMBER AND NAME | ~104 | |
| 19940906153355 | 1 | ~105 | |
| 19940906153400 | GOODS-NUMBER INPUT GUIDE NARRATION | ~106 | |
| 19940906153423 | 3 | | |
| 19940906153424 | 2 | ~107 | |
| 19940906153425 | 1 | | |
| 19940906153425 | GOODS-NUMBER CONFIRMING NARRATION | ~108 | |
| 19940906153440 | 1 | ~109 | |
| 19940906153442 | NUMBER-OF-GOODS INPUT NARRATION | ~110 | ~A |
| 19940906153450 | 3 | ~111 | |
| 19940906153442 | NUMBER-OF-GOODS CONFIRMING NARRATION | ~112 | |
| 19940906153450 | 1 | ~113 | |
| 19940906153453 | COMPLETION-OF-INPUT CONFIRMING NARRATION | ~114 | |
| 19940906153510 | 1 | ~115 | |
| 19940906153512 | CONTENT-OF-ORDER CONFIRMING NARRATION | ~116 | |
| 19940906153530 | ORDER SENDING CONFIRMING NARRATION | ~117 | |
| 19940906153532 | 1 | ~118 | |
| 19940906153535 | ORDER SENDING NUMBER NARRATION | ~119 | |
| 19940906153550 | END-OF-SERVICE NARRATION | ~120 | |
| 19940906153610 | LINE DISCONNECTION | ~121 | |
| 19940906154300 | LINE CONNECTION | ~100 | |
| 19940906154300 | SERVICE BRIEFING | ~101 | |
| 19940906154330 | USER'S NUMBER INPUT NARRATION | ~102 | |
| 19940906154341 | 6 | | |
| 19940906154341 | 4 | | (2) ONE USER'S UNIT (OCCURRENCE OF TROUBLE) |
| 19940906154342 | 3 | | |
| 19940906154343 | 2 | ~103 | |
| 19940906154344 | 2 | | |
| 19940906154344 | 1 | | |
| 19940906154347 | CONFIRMATION OF USER'S NUMBER AND NAME | ~104 | ~B |
| 19940906154355 | 1 | ~105 | |
| 19940906154610 | OCCURRENCE OF TROUBLE FC050546 | ~130 | |
| 19940906154610 | LINE DISCONNECTION | ~121 | |

FIG. 5

| PROCEDURE NUMBER | PROCESSING | USER U | COMPUTER SIDE VOICE RESPONSE SERVICE APPARATUS C | | NAME OF USING DB | CONTENT OF NARRATION |
|---|---|---|---|---|---|---|
| 1 | (1) | | SERVICE BRIEFING | | | "open. pcm" (ACCUMULATED VOICE FILE) |
| 2 | (1) | | USER'S NUMBER INPUT NARRATION | | | [PLEASE, INPUT USER'S NUMBER] |
| 3 | (2) | USER'S NUMBER | INPUT OF USER'S NUMBER | | | |
| 4 | (3) | | INQUIRY OF USER | | USER | |
| 5 | (1) | | CONFIRMATION OF USER'S NUMBER AND NAME | | | [NUMBER XX, ARE YOU SUCH-AND-SUCH ?] |
| 6 | (2) | CONFIRMED RESULT | BRANCHING OF PROCESS | | | |
| | | | 1 | TO PROCEDURE 7 | | |
| | | | 9 | TO PROCEDURE 2 | | |
| 7 | (1) | | GOODS-NUMBER INPUT GUIDE NARRATION | | | [PLEASE, INPUT GOODS-NUMBER.] |
| 8 | (2) | GOODS-NUMBER | INPUT OF GOODS-NUMBER | | | |
| 9 | (3) | | INQUIRY OF GOODS | | GOODS | |
| 10 | (1) | | NUMBER-OF-GOODS CONFIRMING NARRATION | | | [NUMBER XX, ARE YOU SUCH-AND-SUCH ?] |
| 11 | (2) | CONFIRMED RESULT | BRANCHING OF PROCESS | | | |
| | | | 1 | TO PROCEDURE 12 | | |
| | | | 9 | TO PROCEDURE 7 | | |
| 12 | (1) | INPUT OF NUMBER OF GOODS | NUMBER-OF-GOODS INPUT NARRATION | | | [PLEASE, INPUT THE NUMBER OF GOODS.] |
| 13 | (2) | | INPUT OF NUMBER OF GOODS | | | |
| 14 | (1) | | NUMBER-OF-GOOD CONFIRMING NARRATION | | | [IS THE NUMBER OF GOODS OO ?] |
| 15 | (2) | CONFIRMED RESULT | BRANCHING OF PROCESS | | | |
| | | | 1 | TO PROCEDURE 16 | | |
| | | | 9 | TO PROCEDURE 13 | | |
| 16 | (1) | | COMPLETION-OF-INPUT NARRATION | | | [IS THAT ALL ?] |
| 17 | (2) | CONFIRMED RESULT | BRANCHING OF PROCESS | | | |
| | | | 1 | TO PROCEDURE 18 | | |
| | | | 9 | TO PROCEDURE 7 | | |
| 18 | (1) | | ORDER SENDING CONTENT REPETITIVE NARRATION | | | "order. txt" |
| 19 | (1) | | ORDER SENDING CONFIRMING NARRATION | | | [IS IT PERMISSIBLE TO SEND ORDER ?] |
| 20 | (2) | CONFIRMED RESULT | BRANCHING OF PROCESS | | | |
| | | | 1 | TO PROCEDURE 21 | | |
| | | | 9 | TO PROCEDURE 23 | | |
| 21 | (1) | | ORDER SENDING NUMBER NARRATION | | | [ORDER SENDING NUMBER IS OO.] |
| 22 | (3) | | WRITING OF ORDER SENDING CONTENT | | SENDING OF ORDER | |
| 23 | (1) | | END-OF-SERVICE NARRATION | | | "close.pcm" (ACCUMULATED VOICE FILE) |

FIG. 6

| SYNTHESIZING METHOD | DATA QUANTITY Kb/s | EXAMPLE OF METHOD | CHARACTERISTICS | | APPLIED EXAMPLE |
|---|---|---|---|---|---|
| | | | VOICE QUANTITY | NUMBER OF OUTPUT WORDS | |
| WAVEFORM ENCODING | 8~64 | ADPCN. APC-AB | UNDERSTANDABILITY: HIGH NATURALITY: HIGH | SMALL | VOICE ACCUMULATION, RESPONSE SERVICE, CODEC |
| ANALYSIS SYNTHESIZING | 1~8 | PARCOR. LSP | UNDERSTANDABILITY: HIGH NATURALITY: INTERMEDIATE | LARGE | VOICE RESPONSE SERVICE, PRIVATE-USE APPLIANCE VOICE OUTPUT |
| RULE SYNTHESIZING | 0.1~0.2 | VCV. CV. CVC | UNDERSTANDABILITY: INTERMEDIATE NATURALITY: LOW | INFINITE | VOICE RESPONSE SERVICE, READING MACHINE |

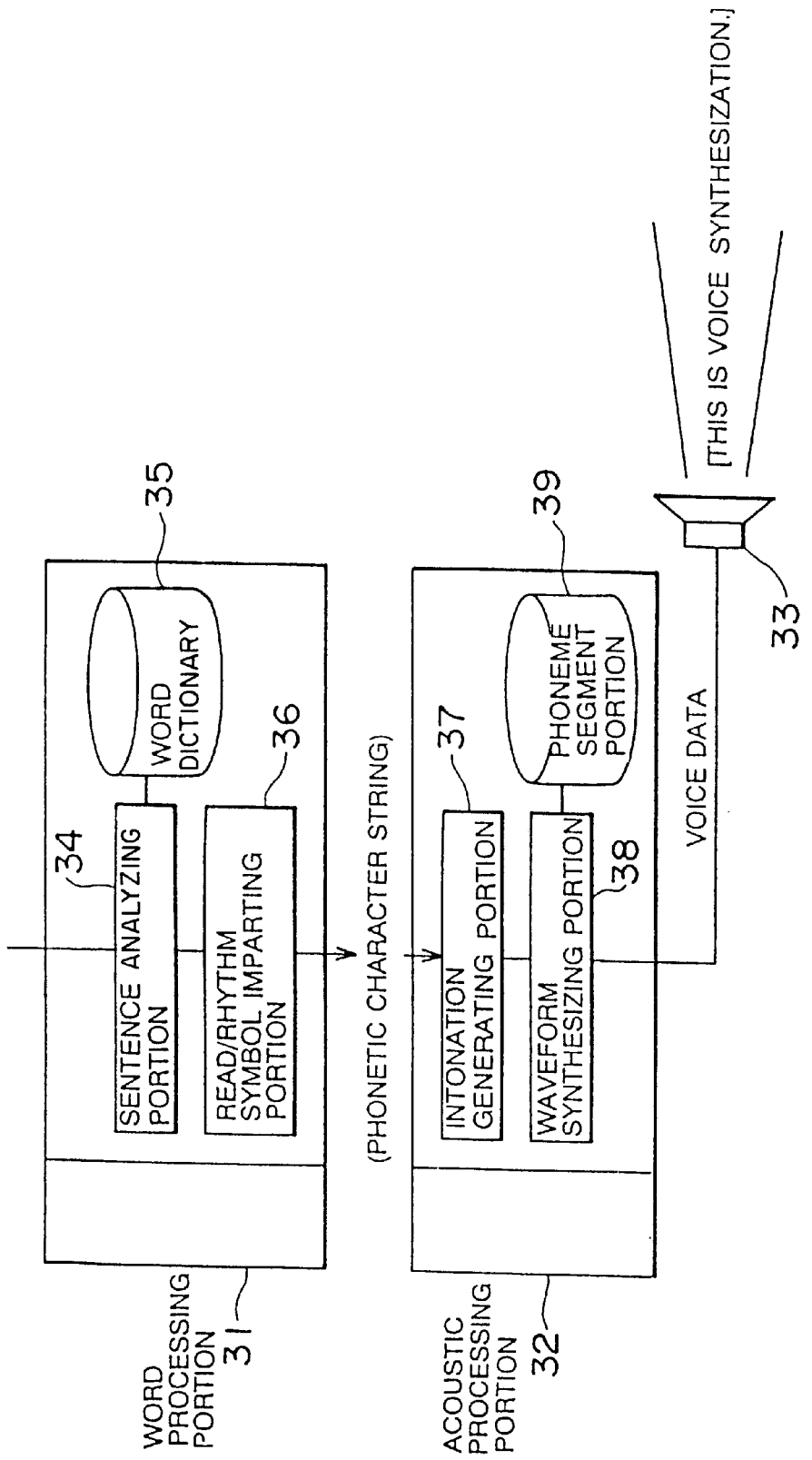

VOICE RESPONSE SERVICE APPARATUS

BACKGROUND OF THE INVENTION

The present invention relates generally to a voice response service apparatus. The present invention relates more particularly to a voice response service apparatus for quickly reproducing history data and changing a voice quality in accordance with attributes such as a sex distinction and an age classification of a telephone service user and also an operation environment of a target user.

A telephone service system of particular interest is known as a computer-assisted voice response service apparatus for making an automated response.

According to such telephone service, voices are emitted with a preset voice quality (speed, voice volume or BGM (background music)). This type of voice response service apparatus sets, when the telephone service is offered, the voice quality to a standard one adapted to, e.g., a given age group.

Such a voice response service apparatus is disclosed in Japanese Patent Laid-Open Publications No. 59-181767 and No. 3-160868. The voice response service apparatuses disclosed in those Patent Publications offer services for referring to a deposit balance by use of a voice recognizing device within the voice response service apparatus.

Further, an apparatus disclosed in Japanese Patent Laid-Open Publication No. 61-235940 corrects an output level so that a voice output level through a telephone is always kept to a fixed value. With this correction, the user is able to easily hear the voice data.

In the apparatus disclosed in Japanese Patent Laid-Open Publication No. 61-235940, however, the user is required to designate a voice volume and a sex distinction in order to correct the output level. That is, the operation is troublesome because of the required manual correction.

Further, apparatuses disclosed in other remaining Publications did not offer services with the voice quality adapted to the user. This kind of voice response service apparatus was required to perform a subtle adjustment to provide easy understanding for the user by emitting a loud voice or slow speech depending on the user. For this reason, such a voice response service apparatus able to automatically change the voice quality according to ages and sexes of the users was needed.

Moreover, the above-described voice response service apparatus is capable of selling goods through telecommunications by making use of telephone service. This voice response service apparatus normally collects pieces of user's data and goods input data from the users as an item of history data.

In the above voice response service apparatus, when receiving an inquiry from the user due to order-sending trouble in terms of a type of goods ordered by the user, a quantity thereof, and an amount of money as well, it is required that the operation of the user be confirmed by tracing back the past history data.

Further, the above voice response service apparatus has hitherto, if a trouble would happen, required manual reproduction of the operation of the user on the basis of the history data.

The above-described voice response service apparatus, however, had to manually reproduce the history data if, e.g., order-sending trouble occurred. This was the only time-consuming, but also entailed an increased expenditure for personnel. In addition, there was a necessity for automatically following up where a malfunction occurred.

Furthermore, in this type of voice response service apparatus, there were manually performed a test for causing the order-sending trouble and a test for smoothly effecting the voice response service. Therefore, a considerable number of testing steps for maintenance, as well as for development, were needed.

SUMMARY OF THE INVENTION

It is a primary object of the present invention to provide well-adapted services by changing a voice quality in accordance with attributes such as sex distinction and age classification of a user for telephone services, and an operation environment of a target user as well.

Further, according to the present invention, the services in the past are reproduced from history data, and contents of the services are readily confirmed. It is another object of the present invention to reduce the number of testing steps for development and maintenance, and also to reduce expenditures for personnel.

According to a first invention, a voice response service apparatus comprises a log data storage unit, an identification data input unit and a voice response reproduction unit. The log data storage unit stores contents of a plurality of processes executed in an interactive form with a user through voice responses in the form of log data indicating a record of time-transitions, and stores identification data for identifying each of the contents of the plurality of processes as a part of contents of the voice responses. The identification data input unit inputs the identification data stored in the log data storage unit. The voice response reproduction unit reads the contents of the interactive-form processes of the log data corresponding to the identification data inputted by the identification data input unit and reproduces the thus read process contents into voices.

Herein, the first invention is established by adding the following additional components.

The log data to be stored in the log data storage unit may contain time data about at least one of a connection time of a telephone line and a disconnection time of the telephone line.

Further, the log data storage unit may store a push button signal received from the user via the telephone line as a piece of character data.

Moreover, a content of the voice response that is stored in the log data storage unit is defined as character data. The voice response reproduction unit may include a voice synthesization processing unit for synthesizing voices to be responded from the character data stored in the log data storage unit.

The voice synthesization processing unit synthesizes the voices by, e.g., a voice rule synthesizing method of synthesizing the voices from a character string. Given as the voice synthesizing method in addition to the above are a waveform encoding method of encoding voice waveforms by making use of a characteristic of a voice signal and an analysis synthesizing method of encoding the voice signal in accordance with a voice generation model.

Further, according to a second invention, a voice response service apparatus for performing processes in an interactive form with a user through voice responses comprises an attribute storage unit and a user voice quality changing unit. The attribute storage unit stores attributes of the user. The user voice quality changing unit changes a voice quality of the voices responding to the user on the basis of the attribute data of the user that are stored in the attribute storage unit.

Herein, the second invention is established by adding the following additional components. That is, the voice quality of the voices that is changed by the user voice quality changing unit may be a voice volume level.

The voice quality of the voices that is changed by the user voice quality changing unit may be at least one of a male voice and a female voice.

Further, according to the first invention, the identification data input unit includes a log data extraction unit for extracting the log data to be used by the user among pieces of log data stored in the log data storage unit and a service execution unit for executing a voice response service by inputting the log data extracted by the log data extraction unit in the form of input data from the user. The voice synthesization processing unit may synthesize the voices from the log data transmitted from the service execution unit.

According to the first invention, the voice response service apparatus may further comprise a line control unit for controlling the telephone line and outputting the push button signal from the user and an item of line connection notifying data to the service execution unit.

According to the first invention, the voice response service apparatus may further comprise a switching unit for connecting the service execution unit to the line control unit when an item of line connection notifying data and the push button signal from the line control unit are outputted to the service execution unit but connecting the service execution unit to the log data extraction unit when the log data extracted by the log data extraction unit are reproduced.

According to the first invention, the voice response service apparatus may further comprise a narrative data transmitting unit for transmitting narrative data to the service execution unit.

According to the first invention, the service execution unit executes a service in accordance with an item of narrative data from the narrative data transmitting unit and offers the service conforming to a value of the push button signal.

According to the first invention, the voice response service apparatus may further comprise a log data writing unit for writing the narrative data from the narrative data transmitting unit to the log data storage unit in the form of the log data when the service execution unit executes the voice response service.

According to the first invention, the voice response service apparatus may further comprise a text file unit for converting the narrative data from the narrative data transmitting unit into character data and writing the converted character data as a text in a file format when the service execution unit executes the voice response service.

According to the first invention, the voice synthesization processing unit may convert the character data written to the text file unit into voice data.

According to the first invention, the voice synthesization processing unit may convert the narrative data from the narrative data transmitting unit into voice data. The voice response service apparatus may include an accumulated voice file unit for storing the voice data converted by the voice synthesization processing unit.

According to the first invention, the voice response service apparatus further comprises a log data writing unit for writing the log data to the log data storage unit. The voice response reproduction unit may reproduce the log data written by the log data writing unit to the log data storage unit.

According to the first invention, the voice synthesization processing unit may be connected to a pseudo line control unit for controlling a pseudo line and may transmit the converted voice data to a loud speaker via the pseudo line control unit.

Furthermore, according to the second invention, the attribute storage unit may include a sex rule table for storing one of male voice and female voice according to a sex of the user and a voice volume table for storing voice volume levels suited to ages of the user. According to the second invention, the voice response service apparatus may further comprise a status rule table for setting a voice volume and a voice speed in accordance with a status of an input operation of the user.

According to the second invention, the user voice quality changing unit may include a voice attribute setting unit for setting a voice attribute with reference to the status rule table. The voice response service apparatus may further comprise a voice synthesization processing unit for synthesizing voice data suited to a user's voice attribute set by the voice attribute setting unit.

According to the second invention, the user voice quality changing unit may include a voice attribute setting unit for setting the voice attributes with reference to the sex rule table and the voice volume table. The voice response service apparatus may further comprise a voice synthesization processing unit for synthesizing voice data suited to a user's voice attribute set by the voice attribute setting unit.

Note that the respective inventions described so far may be properly combined.

According to the present invention, the log data storage unit stores contents of the plurality of processes executed in the interactive form with the user through the voice responses in the form of the log data indicating the record of the time-transitions. The log data storage unit also stores the identification data for identifying each of the contents of the plurality of processes as a part of the contents of the voice responses. When the identification data input unit inputs the identification data stored in the log data storage unit, the voice response reproduction unit reads the contents of the interactive-form processes of the log data corresponding to the identification data inputted by the identification data input unit from the log data storage unit and reproduces the thus read process contents into voices.

Services in the past are thereby automatically reproduced from the log data, and the contents of those services can be easily confirmed.

Further, the processing content can be specified from the connection/disconnection time data of the telephone line that are contained in the log data.

Moreover, the log data storage unit may store a push button signal received from the user via the telephone line as a piece of character data. Accordingly, the log data can be reproduced based on the stored push button signals.

Moreover, the voice synthesization processing unit synthesizes voices for response from the character data stored in the log data storage unit.

Furthermore, the attribute storage unit stores the attributes of the user. The user voice quality changing unit changes the voice quality of the voices responding to the user on the basis of the attribute data of the user that are stored in the attribute storage unit. Accordingly, the services can be offered with the voice quality adapted to the user.

Further, the voice quality of the voices that is changed is the voice volume level, and an easy-to-hear voice volume level is automatically set.

Further, the voice quality of the voices that is changed is the male voice or the female voice, and the user selects one of the voice qualities of the male voice and the female voice and can receive the service with an easier-to-hear voice.

Further, when the log data extraction unit extracts the log data to be used by the user among pieces of log data stored in the log data storage unit on the basis of the identification data, the service execution unit executes the voice response service by inputting the log data extracted by the log data extraction unit in the form of input data from the user. The voice synthesization processing unit synthesizes the voices from the log data transmitted from the service execution unit. A specified processing content can be thereby reproduced from the log data.

Moreover, the line control unit controls the telephone line and outputs the push button signal from the user and the line connection notifying data to the service execution unit. A dialogue between the user and the voice response service apparatus is smoothly conducted.

Further, the switching unit connects the service execution unit to the line control unit, and hence the normal services are to be offered. The switching unit connects the service execution unit to the log data extraction unit, and, therefore, the services in the past can be reproduced from the log data.

Further, the service execution unit is capable of executing the services in accordance with the narrative data from the narrative data transmitting unit.

Further, the service execution unit executes the services in accordance with the narrative data from the narrative data transmitting unit and offers the services based on the values of the push button signals. The dialogue between the user and the voice response service apparatus can be performed based on the narrative data, with the result that a load on the user can be relieved.

Moreover, when the service execution unit executes the voice response services, the log data writing unit writes the narrative data from the narrative data transmitting unit to the log data storage unit in the form of the log data. For instance, if there is an error in the order sending data, it is possible to follow up where a malfunction is produced by reading the log data from the log data storage unit.

Further, the text file unit converts the narrative data from the narrative data transmitting unit into the character data and writes data as the text in the file format, and hence the character data can be synthesized into the voice data by, e.g., voice rule synthesization.

Further, the voice synthesization processing unit converts the narrative data from the narrative data transmitting unit into the voice data, while the accumulated file unit is capable of writing the thus converted voice data.

Moreover, the voice response reproduction unit reproduces the log data written by the log data writing unit to the log data storage unit. It is thus possible to reduce a testing time of a reproduction test performed if a trouble happens.

Further, the voice synthesization processing unit transmits the voice data to the loud speaker via the pseudo line control unit. As a result, the user recognizes an error in the log data in voices by the output from the loud speaker.

Additionally, the sex rule table sets one of male voice and female voice according to the sex distinction of the user. The voice volume table sets the voice volume level conforming to the age of the user. In consequence, it is possible to set the voice volume suited to a favorite of the user.

Further, the status rule table sets the voice volume and the voice speed in accordance with the status of the input operation of the user, and hence an operational load on the user can be relieved.

Moreover, the voice attribute setting unit sets the voice attributes with reference to the status rule table. As a result, the voice attribute adapted to the user can be set.

In addition, the voice synthesization processing unit synthesizes the voice data conforming to the voice attribute of the user that is set by the voice attribute setting unit. That is, the voice volume and the voice speed are changed corresponding to the operational status of the user, whereby the well-adapted services corresponding to the attribute and a degree of skillfulness of the user can be offered.

Further, the voice volume and the voice speed are changed in accordance with the attribute of the user by use of the sex rule table and the voice volume table, whereby the well-adapted services corresponding to the attribute and the degree of skillfulness of the user can be offered.

BRIEF DESCRIPTION OF THE DRAWINGS

Other objects and advantages of the present invention will become apparent during the following discussion in conjunction with the accompanying drawings, in which:

FIG. 2 is a chart showing history data in the mode 1 of the embodiment of the present invention;

FIG. 5 is a chart describing contents of the services in the mode 1 of the embodiment;

FIG. 6 is a chart showing an example of a voice synthesizing method in the mode 1 of the embodiment;

FIG. 7 is a diagram illustrating a specific example of a construction of a voice synthesization processing unit adopting the voice synthesizing method;

DETAILED DESCRIPTION OF THE PREFERRED EMBODIMENTS

Embodiments of a voice response service apparatus according to the present invention will be discussed in detail with reference to the drawings.

<Mode 1 of Embodiment>

Figure 1:
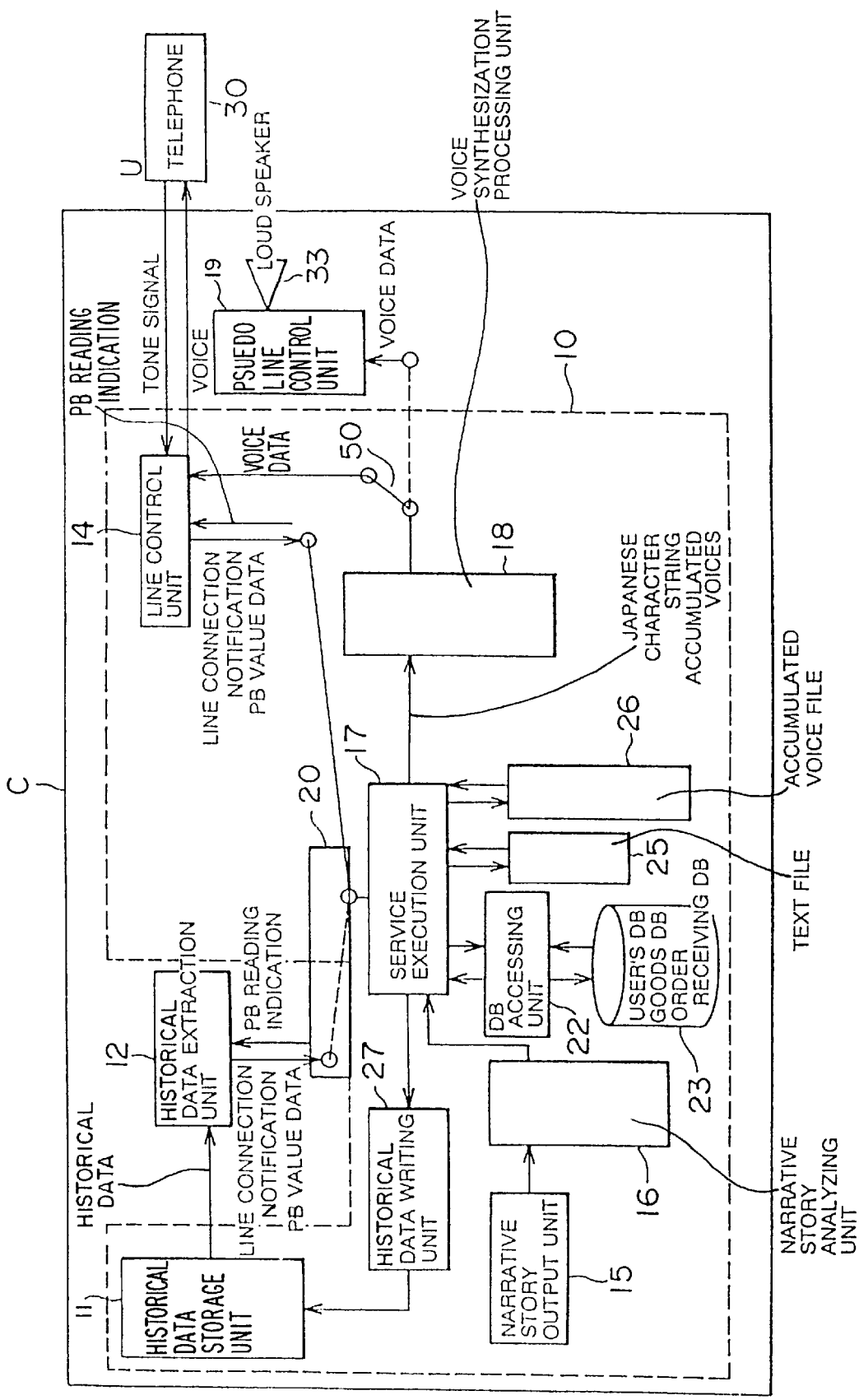
FIG. 1 is a block diagram illustrating a mode 1 of an embodiment of a voice response service system including a voice response service apparatus according to the present invention.

FIG. 1 is a block diagram illustrating a mode 1 of the embodiment of the voice response service system including a voice response service apparatus of the present invention.

The system in mode 1 of the embodiment is applied to overtime services, such as an order-of-goods receiving service, a reservation service, a material request service and a bank pay-in service, by automatically reproducing an interactive process between a user and a computer out of a history data storage unit, thereby reducing personnel expenditure.

Referring to FIG. 1, the voice response service system is constructed of a computer C working as a voice response service apparatus and a telephone U side connected to this computer C and employed by the user. The voice response service system is used for telephone services.

The voice response service system performs a variety of services described above by outputting a push button signal to the computer C from the telephone side in, e.g., a home or an office and effecting the interactive process between the computer C and the telephone U side.

The computer C includes a voice response service unit 10 surrounded by a dotted line, a history data extraction unit 12, a pseudo line control unit 19 and a loud speaker 33.

The voice response service unit 10 operates when the telephone services are performed in a normal state. The voice response service unit 10 has a narrative story output unit 15, a history data storage unit 11, a switching unit 20, a line control unit 14, a service execution unit 17 and a voice synthesization processing unit 18.

FIG. 5 is a chart describing contents of the services. In this chart, the service content is, e.g., an order-of-goods receiving service. This service content is known as a narrative story. The narrative story output unit 15 outputs the narrative story.

FIG. 2 is a chart showing items of history data stored in the history data storage unit 11. When the voice response service is carried out as the narrative story in FIG. 5 indicates, there is shown one example of the history data recorded as in FIG. 2. The history data storage unit 11 records the service contents with the passage of time.

More specifically, the history data storage unit 11 stores log data (history data) representing a time transition of the service content from a start of the service to be offered till a telephone line applied to an order-of-goods receiving system by the user at a time A is disconnected since the telephone line was connected to an end of the service. The history data storage unit 11 records pieces of time data on a connection time and a disconnection time of the telephone line, a time at which the computer reads a narration and a time at which the user effects inputting through a push button.

Figure 3:
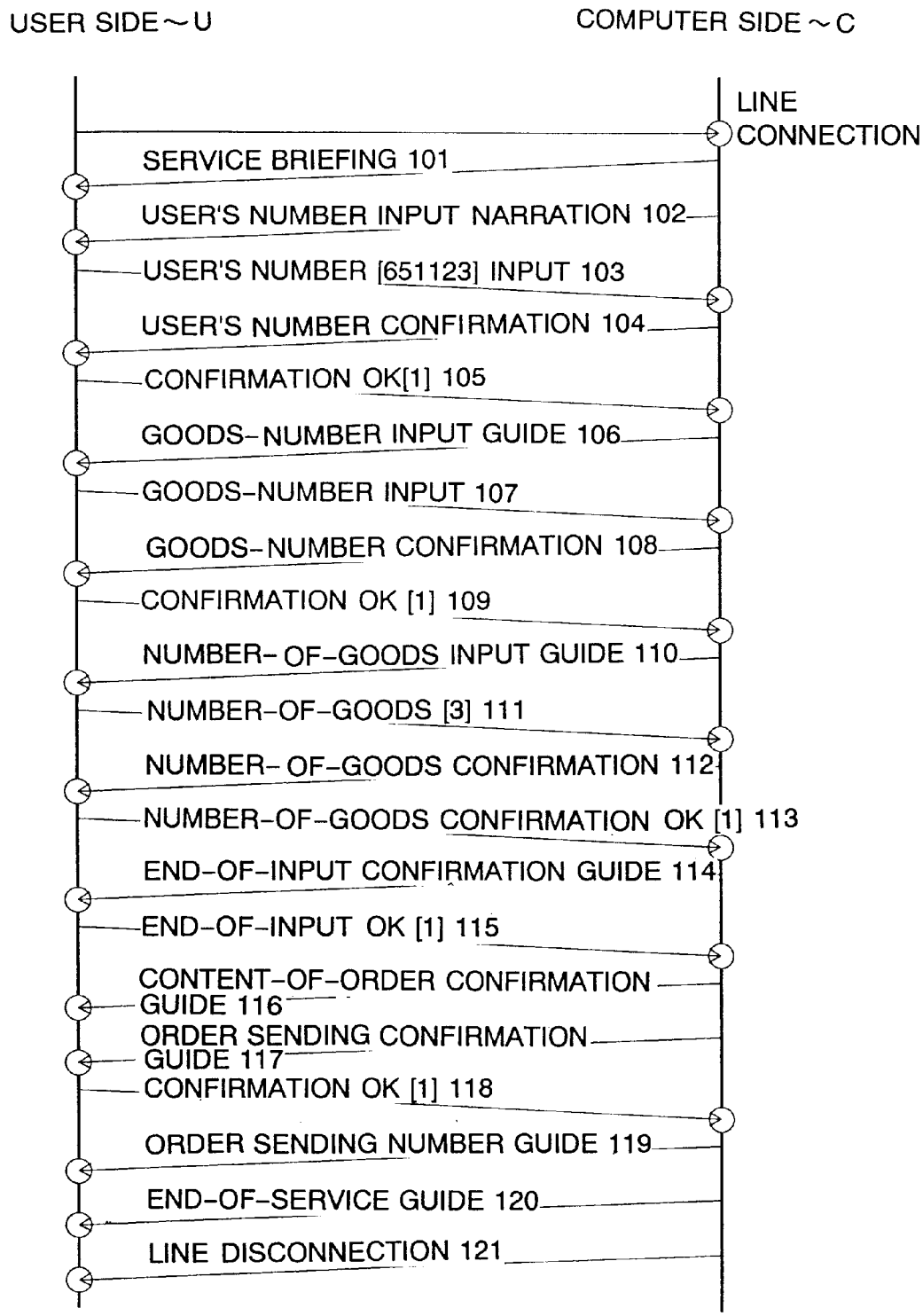
FIG. 3 is a chart showing a sequence in which services are executed as a narrative story says in the mode 1 of the embodiment.
Figure 4:
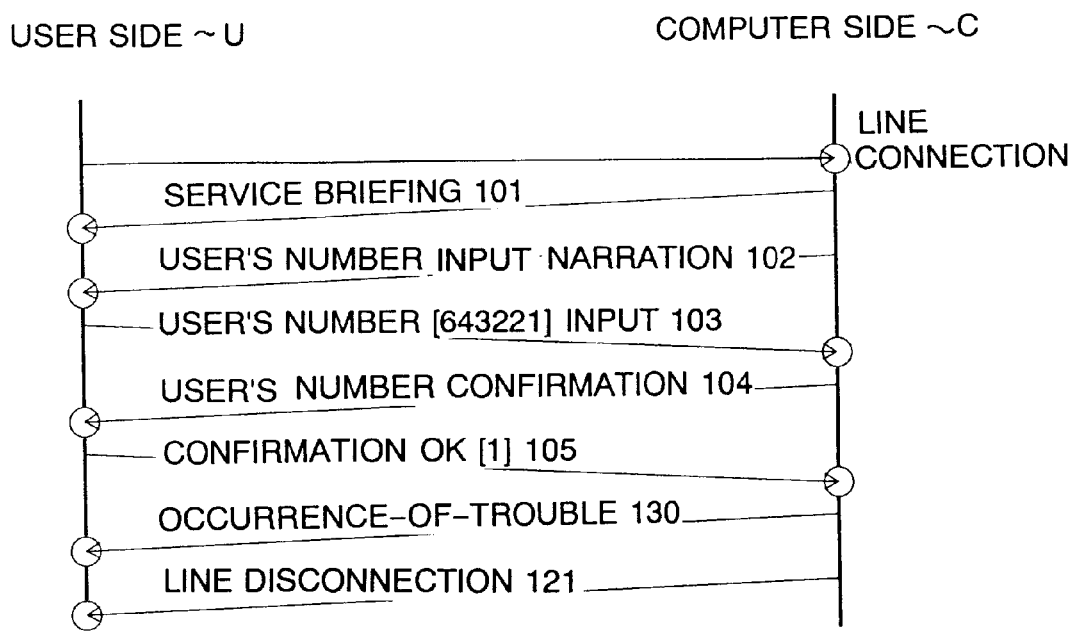
FIG. 4 is a chart illustrating an example where a trouble happens in the course of executing the service in the mode 1 of the embodiment.

FIGS. 3 and 4 are diagrams each showing an operation sequence between the user side (U) and the computer side (C). FIG. 3 is a diagram showing the sequence of executing the service as the narrative story of FIG. 5 indicates. FIG. 4 is a diagram showing an example where a trouble happens in the course of executing the service.

The history data extraction unit 12 is connected to the history data storage unit 11 and operates when reproduction of the service is performed. The history data extraction unit 12 extracts an item of push phone data inputted by the user out of the history data stored in the history data storage unit 11. The switching unit 20 is connected to the history data extraction data 12.

The switching unit 20 is composed of contact points and, when the line control unit 14 is connected to the service execution unit 17, i.e., when a normal service is offered, operates to read a push button signal inputted by the user out of a telephone 30 to a service execution unit 17.

The switching unit 20, when the history data extraction unit 12 is connected to the service execution unit 17, i.e., when the services of the past were reproduced, transmits the push phone data inputted by the user from the history data storage unit 11 via the history data extraction unit 12 to the service execution unit 17. The service execution unit 17 carries out the services of the past from the history data extraction unit 12. The voice synthesization processing unit 18 reproduces the services in voice that were effected in the past by the service execution unit 17.

The voice synthesization processing unit 18 synthesizes the voices from a character string representing a pronunciation on the basis of a rule synthesizing method of synthesizing voices from, e.g., the character string among voice synthesizing methods shown in FIG. 6. The voice synthesizing method used in the voice response service system includes, as illustrated in FIG. 6, a waveform encoding method, an analysis synthesizing method and a rule synthesizing method.

The rule synthesizing method will be explained with reference to FIGS. 7 and 8. According to the rule synthesizing method, a character string mixed with Kana (Japanese phonetic syllabary) and Kanji (Chinese characters) is analyzed in terms of sentences. Signal waveforms composed of the thus analyzed character string are synthesized, thereby converting the character string into voices. Thus rule synthesizing method may require a less amount of data than other methods, and hence the number of output words can be set limitless. The rule synthesizing method is suited to the voice response service system.

The waveform encoding method is a method of synthesizing words by previously recording single words to be read and linking the words to each other. The analysis synthesizing method is a voice synthesizing method of encoding voice signals on the basis of a voice generation model. Based on these methods, the voices can be synthesized.

The telephone services involve the use of voices reproduced from accumulated voices in addition to the pronunciation by the voice synthesizing method. The accumulated voices generally have a better quality than the rule synthesized voices. However, accumulated voices require a recording operation when changing the content thereof, resulting in poor operability. These accumulated voices are suitable for reading an invariable content.

On the other hand, rule synthesized voices are suited to reproduce an unfixed type of voices for a transit sentence, a fixed type sentence and a partly variable sentence.

FIG. 7 is a diagram showing a specific example of a configuration of the voice synthesization processing unit adopting the voice synthesizing method. Referring to FIG. 7, the voice synthesization processing unit 18 is constructed of a word processing portion 31 and an acoustic processing portion 32. The word processing portion 31 is provided with a sentence analyzing portion 34, a word dictionary 35 and a read/rhythm symbol imparting portion 36.

The sentence analyzing portion 34 divides an inputted sentence, performs a word segmentation by collating with the words stored in the word dictionary 35 and sets reading per word, an accent type and an item of grammar data. The read/rhythm symbol imparting portion 36 imparts read and rhythm symbols on the basis of the data obtained from the sentence analyzing portion 34. The rhythm symbols are, for instance, a pause, an accent of a phrase and an intonation.

In this word processing portion 31, when the read/rhythm symbol imparting portion 36 imparts the read and rhythm symbols, the acoustic processing portion 32 outputs sounds synthesizing the waveforms with an addition of the intonation.

The acoustic processing portion 32 is constructed of an intonation generating portion 37, a waveform synthesizing portion 38 and a phoneme segment portion 39 defined as a phoneme database. The intonation generating portion 37 generates intonation patterns representing a time length per phoneme and a pitch of the voice on the basis of the read and the rhythm symbol. The waveform synthesizing portion 38 reads the phoneme segment data stored in the phoneme segment portion 39, smoothly connects pieces of phoneme segment data in accordance with the phoneme time length and the intonation pattern as well, thus synthesizing the voice waveforms.

This acoustic processing portion 32 outputs the waveform-synthesized voice to the loud speaker 33 from the waveform synthesizing portion 38, and the loud speaker 33 in turn outputs a sentence, e.g., [This is voice synthesization.].

Figure 8:
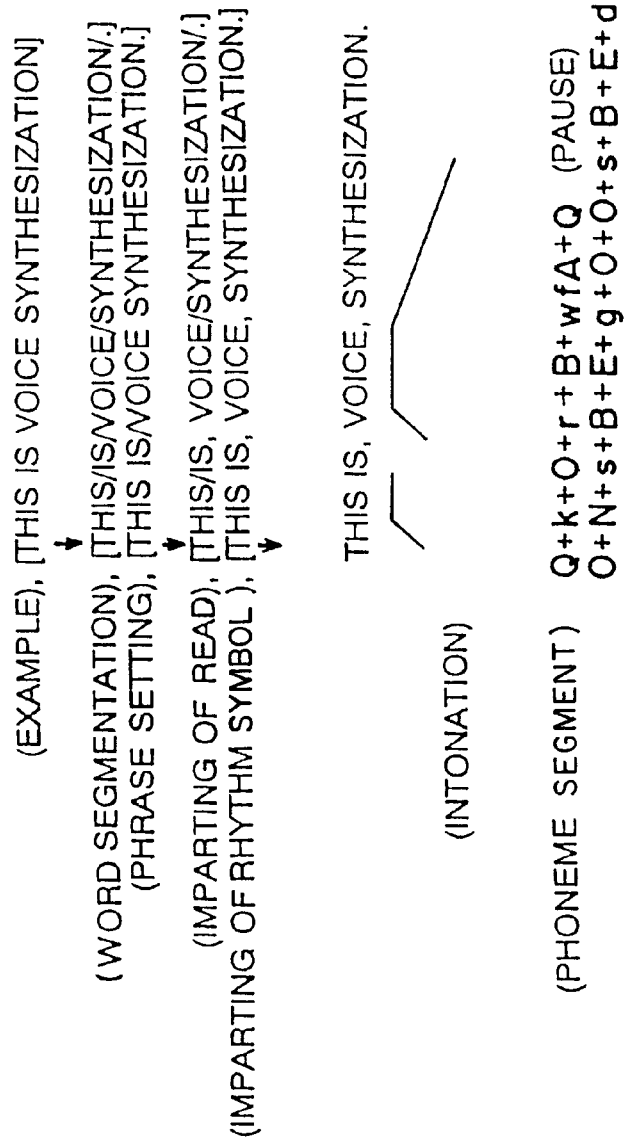
FIG. 8 is a chart showing a specific example where the voices are synthesized by the voice synthesizing method shown in FIG. 7.

FIG. 8 is a diagram showing a specific example where the voices are synthesized based on the voice synthesizing method illustrated in FIG. 7. Taking the sentence of [This is voice synthesization.] shown in FIG. 8 as an example, the present voice synthesization will be explained. At first, the sentence analyzing portion 34 performs the word segmentation by inputting the above sentence. The sentence analyzing portion 34 divides the sentence word by word such as [This/is/voice/synthesization/.].

Next, the sentence analyzing portion 34 sets the phrases. The sentence analyzing portion 34 sets the phrases such as [This is/voice synthesization.].

The read/rhythm symbol imparting portion 36 imparts rhythm codes representing the pause, accents of the phrases and the intonation, as well as imparting the reading. The reading goes such as [This/is/, voice/synthesization/.]. The rhythm codes go like this: [This is, voice, synthesization.].

Next, in the acoustic processing portion 32, the intonation generating portion 37 generates the intonation pattern indicating the voice pitch, and the waveform synthesizing portion 38 reads the phoneme segment data out of the phoneme segment portion 39 and connects the phoneme segment data in accordance with the phoneme time length and the intonation pattern data as well, thus synthesizing the voice waveforms.

The voice data are outputted from the acoustic processing portion 32 by executing the processes given above.

(Explanation of Operation for Normal Services)

Given next is an explanation of an operation for the normal services in the mode 1 of the embodiment of the thus constructed voice response service system.

To start with, the switching unit 20 connects the line control unit 14 to the service execution unit 17. When the narrative story output unit 15 outputs a narrative story to the narrative story analyzing unit 16, the narrative story analyzing unit 16 analyzes the narrative story.

The service execution unit 17 gives a voice output indication to the voice synthesization processing unit 18, an indication to a history data writing unit 27, a push button reading indication and an as-a-result-of-reading processing branch-off indication to the line control unit 14 and an access indication to a database access unit 22. The push button signal inputted by the user is read from the telephone 30 to the service execution unit 17.

With respect to the output of the voices, the services are executed based on the narrative story by use of an accumulated voices file 26, a text file 25, etc.

The database 23 is composed of a user's database to which data on the user are written and a goods database to which goods data are written or an order receiving database to which order receiving data are written.

The database access unit 22 performs write/read processes to and from the database 23. The text file 25 stores the text data beforehand, while the accumulated voice file 26 stores the accumulated voice data. The history data writing unit 27 writes the service content indicated by the service execution unit 17 to the history data storage unit 11. The voice synthesization processing unit 18 synthesizes the voices by the voice synthesizing method that has been already described with reference to FIGS. 6 through 8.

Note that a switching portion 50 is capable of outputting the voice data from the voice synthesization processing unit 18 to the telephone 30 via the line control unit 14. At this time, the contents of the voice response services are modeled without being connected to the telephone line, and those models can be analyzed.

Further, the voice data from the voice synthesization processing unit 18 capable of making the loud speaker 33 emit a sound by controlling the pseudo line control unit 19. The operator can hear the service content in the form of the voice data.

<Narrative Story Output Unit 15>

Next, the narrative story output unit 15 will be described in accordance with procedures from a procedure number 1 up to a procedure number 23 shown in FIG. 5.

In this narrative story output unit 15, story contents are determined based on the procedures 1 through 23.

That is, according to procedure 1, an accumulated voice file [open.pcm] is designated in an outline of the services, and, therefore, [open.pcm] is read out of the accumulated voice file 26 of FIG. 1 and then read aloud by the voice response service unit 10.

According to procedure 2, the voice response service unit 10 reads aloud an input narration, e.g., [Please, input the user's number.] of a user's number of the narrative story output unit 15.

According to procedure 3, when the user inputs the user's number through the push buttons of the telephone 30, a content of this push button input is read in, and the user's number is inputted to the voice response service unit 10.

According to procedure 4, the voice response service unit 10, upon a collation of the user, has the user's database of the database 23 accessed.

According to procedure 5, the voice response service unit 10 reads aloud a result of the collation with the database 23 in procedure 4 as a narration of [The number xx, are you such-and-such?] by way of a user's number and an identification of the user's number of the narrative story output unit 15.

According to procedure 6, the voice response service unit 10 makes the processing branch off on the basis of the result of the identification from the user. In procedure 6, when the user selects [1] through the push buttons of the telephone 30, the processing proceeds to procedure 7. Further, when the user selects [9] by use of the push buttons of the telephone 30, the processing of procedure 2 is again executed.

According to procedure 7, the voice response service unit 10 reads aloud a narration of [Please, input the goods number] as an input guide narration of the goods number of the narrative story output unit 15.

According to procedure 8, when, e.g., the goods number is inputted to the voice response service unit 10 through the push buttons, the voice response service unit 10 reads in the above goods number.

According to procedure 9, the voice response service unit 10, upon a collation with the goods, has a goods database of the database 23 accessed.

According to procedure 10, the voice response service unit 10 reads aloud a result of the collation with the database in procedure 9 as a narration of [The number xx, are you such-and-such?] by way of a goods number identifying narration of the narrative story output unit 15.

According to procedure 11, the voice response service unit 10 makes the processing branch off on the basis of the result of the identification from the user.

In procedure 11, when the user selects [1] through the push buttons of the telephone 30, the processing proceeds to procedure 12.

Further, when the user selects [9] by use of the push buttons of the telephone 30, the processing of procedure 7 is again executed.

According to procedure 12, the voice response service unit 10 reads aloud a narration of [Please, input the number of goods] as a number-of-goods input narration of the narrative story output unit 15.

According to procedure 13, when, e.g., the number of goods is inputted to the voice response service unit 10 through the push buttons, the voice response service unit 10 reads in the number of goods.

According to procedure 14, the voice response service unit 10 reads aloud a narration of [Is that all?] by way of an input completion confirming narration of the narrative story output unit 15.

According to procedure 15, the voice response service unit 10 makes the processing branch off on the basis of the result of the confirmation from the user.

In procedure 15, when the user selects, e.g., [1] through the push buttons of the telephone 30, the processing proceeds to procedure 16.

Further, when the user selects, e.g., [9] by use of the push buttons of telephone 30, the processing of procedure 7 is again executed.

According to procedure 16, the voice response service unit 10 reads aloud a narration of [Is that all?] by way of an input confirmation narration of the narrative story output unit 15.

According to procedure 17, the voice response service unit 10 makes the processing branch off on the basis of the result of the confirmation from the user.

In procedure 17, when the user selects, e.g., [1] through the push buttons of the telephone 30, the processing proceeds to procedure 18.

Further, when the user selects, e.g., [9] by use of the push buttons of the telephone 30, the processing of procedure 7 is again executed.

According to procedure 18, a text file [order.txt] is designated in an order sending content repetitive narration in the narrative story output unit 15. Thus, the voice response service unit 10 reads aloud the narration read from a text file 25.

According to procedure 19, the voice response service unit 10 reads aloud a narration of [Is that all?] by way of an order sending confirmation narration of the narrative story output unit 15.

At this time, according to procedure 20, the voice response service unit 10 makes the processing branch off on the basis of the result of the confirmation from the user.

In procedure 20, when the user selects, e.g., [1] through the push buttons of the telephone 30, the processing proceeds to procedure 21.

Further, when the user selects, e.g., [9] by use of the push buttons of the telephone 30, the processing of procedure 23 is executed.

According to procedure 21, the voice response service unit 10 reads aloud a narration of [Is the order sending number 00?] by way of an order sending number narration of the narrative story output unit 15.

According to procedure 22, an order sending process is to be executed. A content of the order received is written to an order sending database of the database 23.

According to procedure 23, an accumulated voice of [close.pcm] is designated in an end-of-service narration of the narrative story output unit 15. Hence, [close.pcm] is read out of the accumulated voice file 26 and read aloud by the voice response service unit 10.

The above-described voice response service apparatus of FIG. 5 is capable of surely performing the processing in the interactive form between the telephone 30 of the user U side and the voice response service unit 10 of the computer C.

(Explanation of Sequence of FIG. 3)

The processing of FIG. 3 will be explained by using the above-explained narrative story output unit 15 of FIG. 1.

For example, on the user U side, when a user's number [651123] is inputted as an input 103 through the push buttons of the telephone 30, the user's number [651123] is transmitted to the computer C side.

An item of transmission data, i.e., the user's number [651123] transmitted to the computer C side, is confirmed by the line control unit 14 on the computer C side. Thereafter, a narrative story 104 is outputted from the narrative story output unit 15. Then, a confirmation guide 104 for the user's number and the user's name is transmitted to the telephone 30 on the user's side.

On the other hand, on the computer C side, as illustrated in FIG. 3, after the line control unit 14 has made sure of a confirmation OK of the user's number and the user's name transmitted from the user U side, the narrative story output unit 15 outputs a narrative story 106. This is in order to output an input guide indication of the goods number to the telephone 30 on the user U side from the computer C side.

The narrative story output unit 15 outputs the narrative story to the narrative story analyzing unit 16, and the narrative story analyzing unit 16 analyzes the narrative story.

The service execution unit 17 executes the service by use of the database 23 or the files 25, 26 in accordance with the narrative story analyzed by the narrative story analyzing unit 16.

(Processing When Sending Order)

Further, in the telephone 30 on the user U side, the user inputs a goods number [321] through the push buttons of the telephone 30 in accordance with the guide 106 to a goods number inputting indication sent from the narrative story output unit 15 on the computer C side. This goods number [321] is defined as a code data representing a specific goods.

When the user U inputs the goods number [321] as an input 107 to the computer C side through the telephone 30, the line control unit 14 on the computer C side makes sure of the goods number [321] and further confirms that the goods number [321] exists on the goods database of the database 23. Then, a confirmation indication guide for the goods number [321] is transmitted in the form of a transmission 108 to the telephone 30 on the user U side from the computer C side.

In the telephone 30 of the user U side, when receiving the confirmation indication guide for the goods number [321] from the computer C side, a piece of confirmation data [1], for indicating that a self-order goods is identified with the goods represented by the goods number [321], is inputted through the push button of the telephone 30.

Next, a number-of-goods input guide 110 is transmitted to the telephone 30 on the user U side from the computer C side.

The telephone 30 on the user U side that receives the number-of-goods input guide 110 inputs the number of goods to be ordered, e.g., [3] as an input 111 through the push buttons of the telephone 30.

When the data on the number of goods to be ordered is transmitted to the computer C side from the user U side, the computer C side makes sure of a stock of the goods in the goods database of the database 23. An item of number-of-goods confirmation data 112 of that goods is transmitted to the telephone 30 on the user U side from the computer C side.

At this time, in the telephone 30 on the user U side, an item of number-of-goods confirmed data [1] is inputted as an input 114 through the push buttons of the telephone 30.

When an input end confirmation guide 114 is transmitted to the telephone 30 on the user U side from the computer C side, and if an input completion is intended, i.e., if it is, e.g., [1], an end indication is inputted in the form of an input 115 through the push buttons of the telephone 30 and then transmitted to the computer C side from the user U side.

When the above response indication is given between the computer C side and the telephone 30 on the user U side, for confirming the intention of sending the order, the confirmation guide 116 and the order sending confirmation guide 117 of the order content of the narrative story output unit 15 are transmitted to the telephone 30 on the user U side from the computer C side.

With respect to those guides, in the telephone 30 on the user U side, the user inputs order sending process data [1] as an input 118 through the push buttons of the telephone 30.

When the computer C confirms that the order sending process data [1] is transmitted to the computer C side from the telephone 30 on the user U side, an order sending number guide 119 and an end-of-service guide 120 are transmitted to the user U side from the computer C side. Then, the computer C side is disconnected as a disconnection 121 from the telephone line of the telephone 30 on the user U side.

From the above, in accordance with mode 1 of the embodiment, when performing, e.g., the goods order sending service in the interactive form between the user U side and the computer C side, the history data writing portion 27 is capable of writing the log data shown in FIG. 2 to a specific write area of the history data storage unit 11. Further, the history data extraction unit 12 adequately reads the log data written thereto, thereby making it possible to smoothly execute the order sending service if there is an error in the order sending data.

(Processing When Trouble Happens on Computer Side)

Next, there will be explained processing when a trouble situation happens on the computer C side. FIG. 4 is a sequence diagram showing the processing when an order-sending problem occurs. Omitted are detailed explanations of the processing from an outline explanation 101 to a user's confirming indication 105 of the same sequence as that in FIG. 3.

Further, a discussion on FIG. 4 with reference to the symbols in FIGS. 1 through 3 is given. In mode 1 of the embodiment, after the user has inputted [1] of a confirmation OK 105 through the push buttons of the telephone 30, it is assumed that some problems occur in the software, the database 23, the text file 25 and the accumulated voice file 26 on the computer C side.

In this case, the user is notified of an occurrence-of-trouble 130 on the computer C side, and, for this purpose, the computer C transmits an occurrence-of-trouble signal to the telephone 30 of the user. Hereupon, the telephone line is disconnected as a disconnection 121.

Thus, if the trouble is caused during the service, a reproduction test or a confirmation test, after a trouble repair has been done, are to be conducted. In this instance, the history data stored in the history data storage unit 11 of FIG. 1 is reproduced. This enables the user to recognize that the trouble is attributed to the computer C side. Further, the testing can be automatically carried out, and, therefore, test time is reduced.

(Reproduction of Voice Response Service)

Next, the reproduction of the voice response service will be explained. As stated above, when the normal services are offered, the line control unit 14 recognizes the signal inputted by the user U through the push buttons of the telephone 30, and the push button signal thereof is read by the service execution unit 17.

On the other hand, when the voice response service is reproduced, the switching unit 20 connects the service execution unit 17 to the history data extraction unit 12. The history data extraction unit 12 extracts (specifies) the services that were used in the past by the user from the history data storage unit 11 and sends a numerical value, inputted through the push buttons, that has been recorded on the history storage unit 11 to the service execution unit 17 as a read value through the push buttons.

The voice synthesization processing unit 18 reproduces the history data extracted by the history data extraction unit 12, i.e., the voice response services in the past. Thus, in accordance with mode 1 of the embodiment, the voice response service can be reproduced by a pseudo execution of the voice response service.

The operation at this time will be explained with reference to FIGS. 2 and 5. As an example, there is reproduced a content of a service of a user's number 651123 with which the service is used on Sep. 6, 1994.

At this time, the line control unit 14 sends the voices reproduced by the voice synthesization processing unit 18 to the telephone 30 of the user U. The user is able to hear the content of the service in the past.

The history data extraction unit 12 specifies the user's history data to be reproduced among pieces of history data of FIG. 2 that have been stored in the history storage unit 11. A method of specifying the history data will be explained in detail in relation to a column (of the operation for specifying the user's history data) with reference to FIG. 10. Herein, e.g., an item of history data A among pieces of history data shown in FIG. 2 is to be specified.

Further, the switching unit 20 connects the history data extraction unit to the service execution unit 17 to actuate the history data extraction unit 12, thereby starting the reproduction in accordance with the service story of FIG. 5.

The operation of the narrative story output unit 15 has already been fully described in the <Narrative Story Output Unit>, and therefore its explanation will be omitted herein.

According to procedures 1 and 2 of FIG. 5, the voice response service unit 10 reads aloud the explanation of an outline of the service and an input of the user's number as usual.

When inputting the user's number according to procedure 3, the service execution unit 17 gives a read indication of the push buttons to the history data extraction unit 12. The history data extraction unit 12 reads aloud a user's number [651123] 103 of the history data shown in FIG. 2, and the voice synthesization processing unit 18 synthesizes [six, five, one, one, two, three], thereby obtaining a piece of voice data. The line control unit 14 transmits the voice data to the telephone 30 of the user U, and the user's number is transferred to the user.

According to procedure 5, the operation is performed as usual. According to procedure 6, the processing branches off on the basis of a result given from the user, and therefore the service execution unit 17 gives the read indication through the push buttons to the history data extraction unit 12. The history data extraction unit 12 reads aloud a user confirmation [1] 105, while the voice synthesization processing unit 18 synthesizes [one], thereby obtaining a piece of voice data. The voice data is transmitted by the line control unit 14 to the telephone 30 of the user U, and a result of confirmation is transferred to the user. Then, the processing branches off to procedure 7.

An explanation of the processing subsequent thereto will be omitted, but the services in the past can be reproduced by performing the services up to the line disconnection 121.

Note that a switching unit 50 connects the voice synthesization processing unit 18 to the pseudo line control unit 19, and, in this case, the voice data from the voice synthesization processing unit 18 may be outputted via the pseudo line control unit 19 to the loud speaker 33.

Further, in this example, the voice synthesization processing unit converts a number of the push buttons into a voice and transfers its number to the user. For example, the number of the push buttons is not sent to the voice synthesization processing unit 18 unless the necessity arises, and it is possible not to transfer such a number to the user.

(Operation for Specifying History of User)

Figure 9:
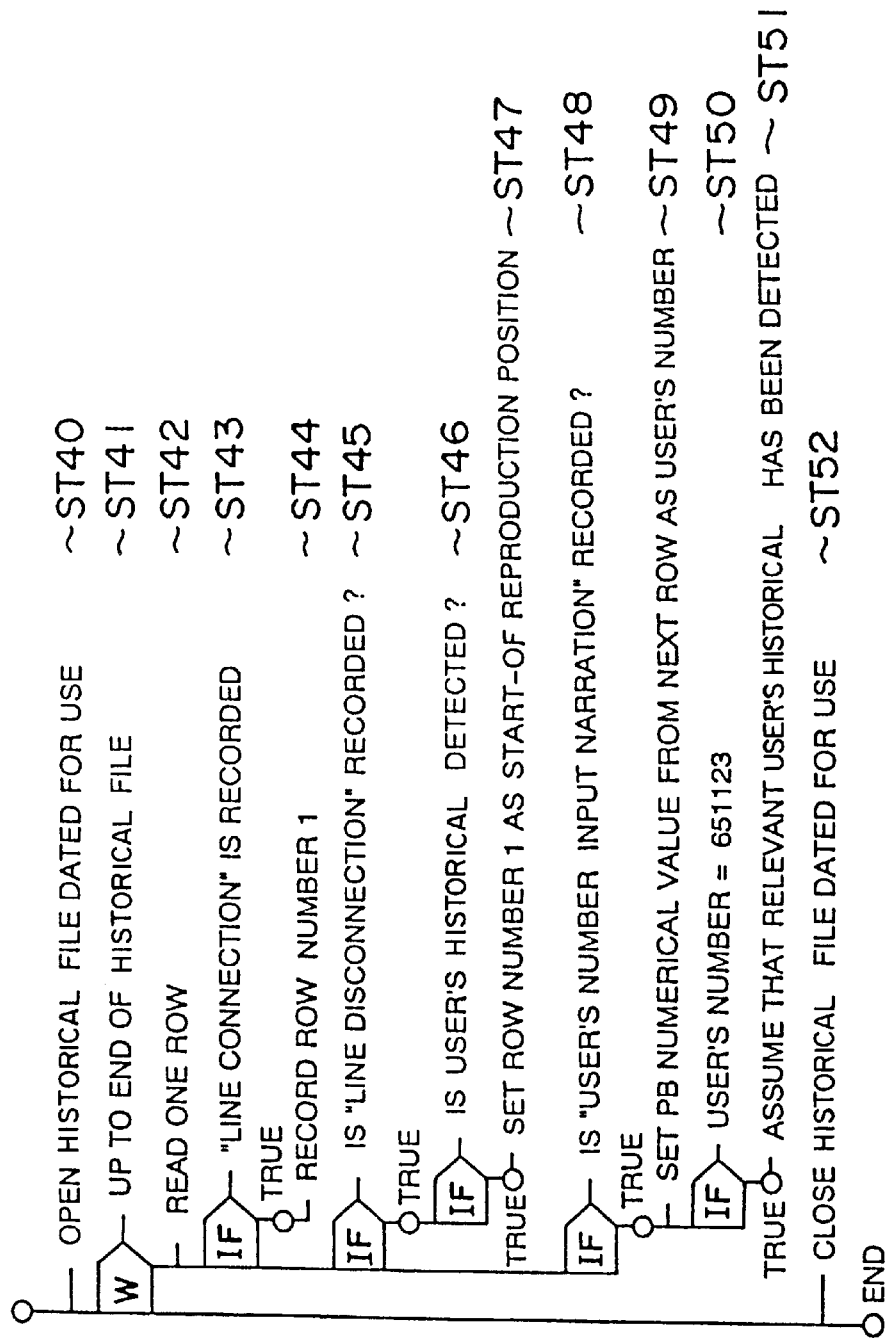
FIG. 9 is a flowchart showing processes for specifying a record to be reproduced by the user from a history file.

Next, an operation for specifying the user's history will be explained in detail. FIG. 9 is a flowchart showing processes for specifying a record to be reproduced by the user from the history file. The operation for specifying the user's history is performed by the history data extraction unit 12 extracting the history data.

To begin with, there is opened a history file dated for use within the history data storage unit 11 (ST40). Herein, the explanation will be given by exemplifying the history file of FIG. 2. The following processes are to be carried out to an end of this history file.

At first, one row is read from the history file (ST42). For example, if a [line disconnection] is recorded in the row read in ST42, there is a possibility for a start-of-reproduction position. For this reason, the row number 1 is recorded on the history data storage unit 11 (ST43, ST44).

If the [line disconnection] is recorded in the row read in ST42 (ST45), and when the user's history is detected (ST46), then row number 1 is determined as the start-of-reproduction position (ST47).

If a [user's number input narration] is recorded in the row read in ST42 (ST48), a push button input numerical value from the next row is set as a user's number (ST49).

Herein, when the user's number to be reproduced is identical with the user's number in ST49 (ST50), it is determined that the relevant user's history is detected (ST51).

After effecting the above process till the history file is ended, the history file dated for use is closed. The user's history can be thereby specified.

As discussed above, in accordance with mode 1 of the embodiment, when performing, e.g., a goods order sending service in the interactive form between the user U side and the computer C side, the log data shown in FIG. 2 can be written to a specified write area of the history data storage unit 11. The thus-written log data is properly read, thereby making it possible to smoothly execute the order sending service if there is an error in the order sending data.

Further, the transferring and receiving between the user U side and the computer C side in the voice response service such as a telephone service are reproduced in the form of the log data, and the user is made to hear the log data. It is thereby possible to follow up where a malfunction is produced due to mis-pushing of the push buttons, when the user inputs through the push buttons.

Written to the history storage unit 11 are, for instance, pieces of time-series data such as a connecting time and a disconnecting time of the telephone line, a user's data read starting time and a user inputting time through the push buttons. For this reason, if there is an input mistake by the user, the user is capable of easily recognizing where the malfunction is caused by reproducing the above data.

Furthermore, the number of testing steps can be reduced by automatically performing the testing.

<Mode 2 of Embodiment>

Figure 10:
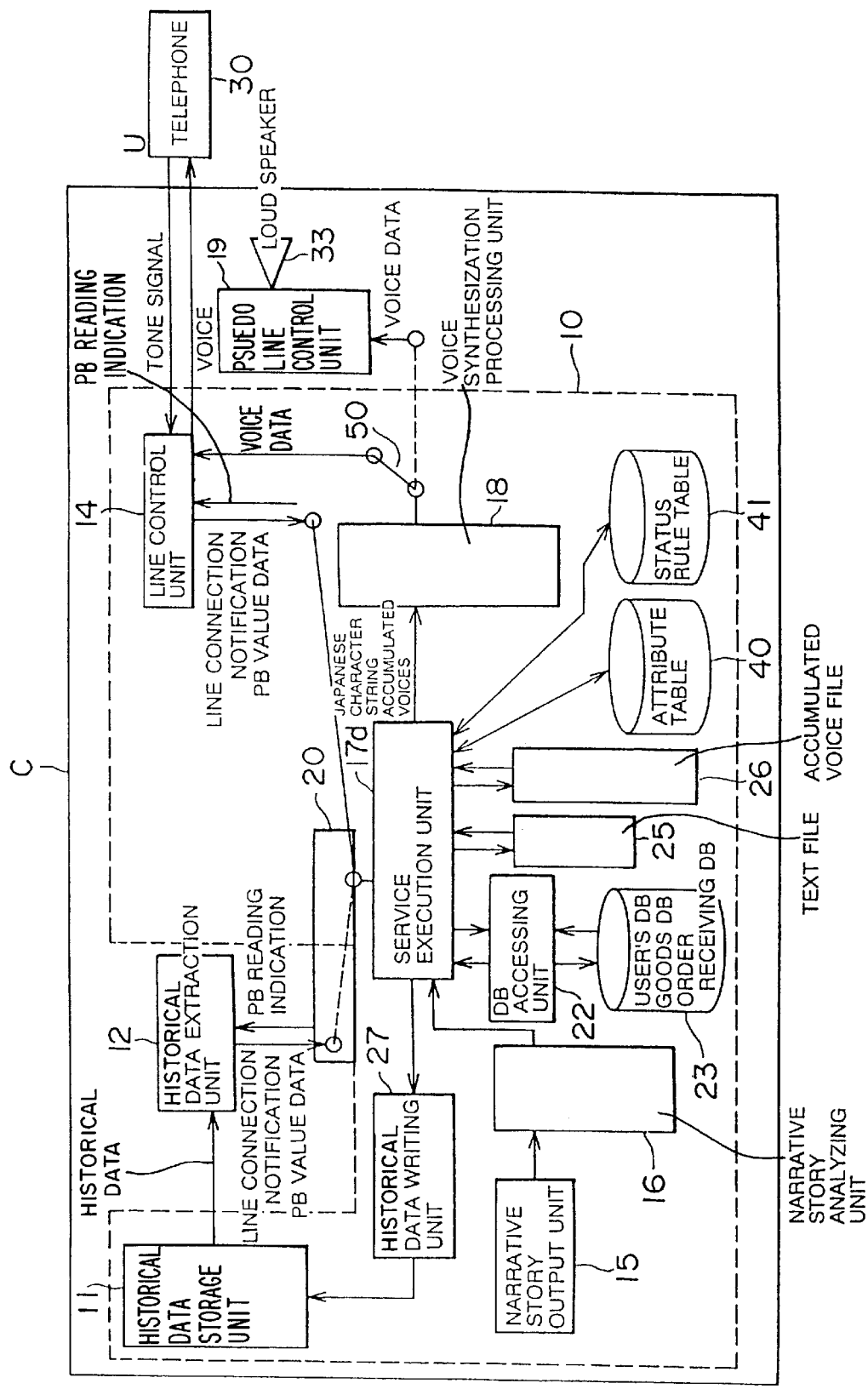
FIG. 10 is a block diagram illustrating a mode 2 of the embodiment of the voice response service system including the voice response service apparatus of the present invention.

FIG. 10 is a block diagram illustrating a mode 2 of the embodiment of the voice response service system including the voice response service apparatus of the present invention. When the services are executed by a man, the voice is spoken loudly or slowly corresponding to a situation of a target user. That is, a voice volume is adjusted enough to make the target user understand easily.

In mode 2 of the embodiment, the computer automatically changes a voice quality depending on pieces data about the age and sex of the target user and a state of pronunciation such as easy- and hard-to-hear degrees. The computer carries out the service with a voice quality dynamically adjusted to the user.

Herein, with respect to a construction illustrated in FIG. 10, only configurations different from those shown in FIG. 1 in mode 1 of the embodiment will be explained. Other components are marked with like symbols, and their detailed explanations will be omitted herein.

Referring to FIG. 10, an attribute table 40 and a status rule table 41 are connected to the service execution unit 17. These tables are provided in an unillustrated database. In the attribute table 40, there are set volume levels corresponding to the classification of the ages and sexes of the users. In the status rule table 41, there is set a voice volume or a speaking speed corresponding to a status of the input operation of the user.

Figure 11:
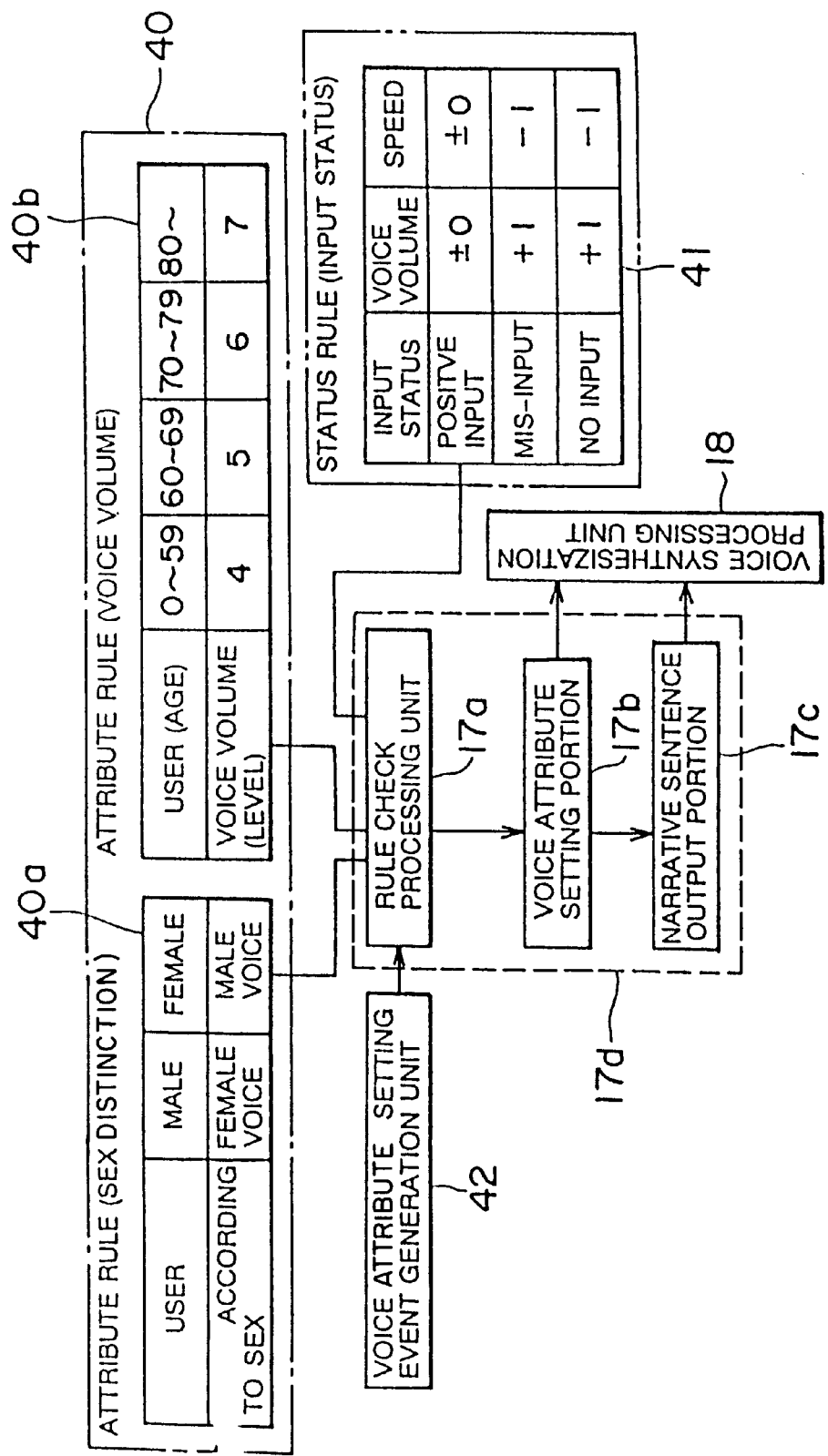
FIG. 11 is a constructive block diagram illustrating the principal portion in the mode 2 of the embodiment shown in FIG. 10.

FIG. 11 ia a block diagram illustrating a construction of the principal portion in mode 2 of the embodiment shown in FIG. 10. Referring to FIG. 11, the attribute table 40 is composed of a sex rule table 40a, in which to memorize male and female voices according to the sexes of the users, and a voice volume table 40b in which to memorize variations in the voice volume level according to the ages of the users.

In the sex rule table 40a, in case the user is a male, a synthesized female voice is selected to produce a softness of the voice. In case the user is a female, a synthesized male voice is selected to produce a well-modulated voice.

The voice volume levels according to the classification of the ages of the users can be roughly set in the voice volume table 40b.

For instance, the voice volume level is set to 4 when the user's age ranges from 0 to 59 but to 5 when it ranges from 60 to 69. The voice volume level is set to 6 when the user's age ranges from 70 to 79 but to 7 when it ranges from 80 to 89.

That is, the voice volume level is set in such a way that the it rises sequentially from 1, and the voice volume becomes larger with a larger numerical value. The voice volume is set roughly according to the classification of the ages and the sexes of the users.

The voice volume levels are set roughly corresponding to the users in the sex rule table 40a and the voice volume table 40b. In the status rule table 41, the voice volume or the voice speed is adjusted corresponding to the user.

The sex rule table 40a, the voice volume table 40b and the status rule table 41 are connected to a service execution unit 17d. A voice attribute setting event generation unit 42 and the voice synthesization processing unit 18 are connected to the service execution unit 17d.

For instance, an indication showing that the voice volume is small, and the speed is slow is transmitted to the voice attribute setting event generation unit 42 through the push buttons, and, in this case, the voice attribute setting event generation unit 42 generates an event for setting a voice attribute of the user.

The service execution unit 17d is constructed of a rule check processing portion 17a for checking rules of the attribute table 40, a voice attribute setting portion 17b for setting the voice attribute according to a processing output of this rule check processing portion 17a and a narrative sentence output portion 17c for outputting a narrative sentence from the narrative story output unit 15 in accordance with the voice attribute output of this voice attribute setting portion 17b.

The status rule table 41 can be set so that the voice volume rises by only one level, but, at the same time, the voice speed decreases by only one level.

The voice synthesization processing unit 18 synthesizes the voices from the output of the narrative sentence output portion 17c as well as from the output of the voice attribute setting portion 17b.

(Operation in Mode 2 of the Embodiment)

Next, the operation in the mode 2 of the embodiment will be discussed. For example, if the user's attribute exists on the database, the user's attribute is obtained from the user's number or the like, or alternatively an arbitrary user inputs an attributes of user's own through the push button of the telephone 30. Hereupon, the voice attribute setting event generation unit 15 generates a setting event of the voice attribute.

The rule check processing unit 17a refers to the sex rule table 40a and the voice volume table 40b in accordance with the output from the voice attribute setting event generation unit 15 and outputs the referred table data to the voice attribute setting portion 17b. The voice attribute setting portion 17b sets a voice attribute of the user.

For example, if a male aged 61 uses this voice response service, the sex rule table 40a and the voice volume table 40b are referred, and the female voice is set to soften the voice, while the voice volume level is set to 5.

Further, in the voice attribute setting event generation unit 15, when an input operation is generated from the user, the rule check processing unit 17a refers to the status rule table 41. The voice attribute setting portion 17b sets the voice attribute from the table data of the status rule table 41.

For instance, when the user makes an input error, the voice speed is decreased by only one level, but the voice volume is increased by only one level.

That is, it can be considered that the voice can not be heard because of the narration being fast with a small voice volume. In this case, the voice quality is changed so that the voice is spoken slowly and loudly.

On the other hand, an attribute setting command of the voice suited to the user is outputted from the voice attribute setting portion 17b, and an narration is outputted from the narrative sentence output portion 17c. Hereupon, the voice synthesization processing unit 18 synthesizes the voices with a voice quality suited to the user.

Thus, in accordance with the mode 2 of the embodiment, the voice response service can be offered with the easy-to-hear voice quality to every type of users by automatically changing the voice quality on the basis of the data about the classification of ages and sexes of the users and the pronunciation state such as the easy- and hard-to-hear degrees.

The user service can be thereby improved by eliminating the malfunction due to the mistake in terms of hearing.

Further, in case the mode 2 of the embodiment is applied to the goods order receiving service, the reservation service and the material request service, a mis-recognition due to the voice of the user is reduced, and those services can be smoothly conducted.

It is apparent that, in this invention, a wide range of different working modes can be formed based on the invention without deviating from the spirit and scope of the invention. This invention is not restricted by its specific working modes except being limited by the appended claims.

What is claimed is:

1. A voice response service apparatus comprising:
   service execution means for executing a service transaction in response to interaction with a user, the interaction formed by providing voice guidance to the user and receiving character responses from the user;
   a log data storage storing log data indicating a history of the interaction and identification data identifying the log data;
   means for specifying identification data from the stored identification data responsive to an indication from said service execution means to read a stored character response from the stored log data, the specified identification data corresponding to a character response input by the user during the interaction; and
   voice reproduction means for reading the contents of the log data identified by the specified identification data from said log data storage and outputting speech corresponding to the contents of the identified log data.

2. A voice response service apparatus according to claim 1, wherein the log data contains time data about at least one of a connection time of a telephone line and a disconnection time of the telephone line.

3. A voice response service apparatus according to claim 1, wherein said log data storage stores a push button signal received from the user via the telephone line as a piece of the character response.

4. A voice response service apparatus according to claim 1, wherein the voice guidance is defined as character data, and
   said voice reproduction means includes:
   a voice synthesization processing device which synthesizes voices from the character data in the log data.

5. A voice response service apparatus according to claim 4, further comprising:
   log data extraction means for extracting log data identified by the identification data by said specifying means from the log data stored in said log data storage;
   wherein said service execution means executes a re-play of the service transaction in response to the history of the interaction indicated in the log data extracted by said log data extraction means; and
   wherein said voice synthesization processing device synthesizes the voices in cooperation with said service execution means.

6. A voice response service apparatus according to claim 5, further comprising:
   line control means for controlling the telephone line and outputting a push button signal from the user and an item of line connection notifying data to said service execution means.

7. A voice response service apparatus according to claim 6, further comprising:

switching means for connecting said service execution means to said line control means when the item of line connection notifying data and the push button signal from said line control means are outputted to said service execution means and connecting said service execution means to said log data extraction means when the log data extracted by said log data extraction means are to be reproduced.

8. A voice response service apparatus according to claim 6, further comprising:

narrative data transmitting means for transmitting narrative data to said service execution means.

9. A voice response service apparatus according to claim 8, wherein said services execution means executes a service in accordance with an item of narrative data from said narrative data transmitting means and offers the service conforming to a value of the push button signal.

10. A voice response service apparatus according to claim 8, further comprising:

log data writing means for writing the narrative data received from said narrative date transmitting means to said log data storage as log data when said service execution means executes the voice response service.

11. A voice response service apparatus according to claim 8, further comprising:

text file means for converting the narrative data from said narrative data transmitting means into character data and writing the converted character data in a text file format when said service execution means executes the voice response service.

12. A voice response service apparatus according to claim 11, wherein said voice synthesization processing means converts the character data, written to said text file means, into voice data.

13. A voice response service apparatus according to claim 8, wherein said voice synthesization processing means converts the narrative data, from said narrative data transmitting means, into voice data, said voice response service apparatus including:

accumulated voice file means for storing the voice data converted by said voice synthesization processing means.

14. A voice response service apparatus according to claim 1, further comprising a log data writing means for writing the log data to said log data storage.

wherein said voice response reproducing means reproduces the log data written by said log data writing means to said log data storage.

15. A voice response service apparatus according to claim 12, wherein said voice synthesization processing means is connected to a pseudo line control means for controlling a pseudo line and transmits converted voice data to a loud speaker via said pseudo line control means.

16. A method of providing a voice response service comprising:

executing a voice response service transaction based on interaction with a user, the interaction formed by providing voice guidance to the user and receiving character responses from the user;

storing log data to indicate a history of the interaction and storing identification data identifying the log data;

specifying identification data from the stored identification data responsive to an indication to read a stored character response, the specified identification data identifying a relevant portion of the stored log data and corresponding to a character response input by the user during the interaction;

reading the history according to the log data identified by the specified identification data; and outputting the history read in the reading step as speech.

17. A computer-readable medium encoded with a program for providing a voice response service, said program comprising instructions for:

executing a voice response service transaction based on interaction with a user, the interaction formed by providing voice guidance to the user and receiving character responses from the user;

storing log data to indicate a history of the interaction and storing identification data identifying the log data;

specifying identification data identifying a relevant portion of the stored log data, the specified identification data corresponding to a character response input by the user during the interaction;

reading the history according to the log data identified by the specified identification data; and outputting the history read in the reading step as speech.

* * * * *

UNITED STATES PATENT AND TRADEMARK OFFICE
CERTIFICATE OF CORRECTION

PATENT NO.:     6,052,441
DATED      :    April 18, 2000
INVENTOR(S):    Atsuko SATO It is certified that errors appear in the above-identified patent and that said Letters Patent is hereby corrected as shown below:

Col. 19,    line 35, change "means" to --device--.
            line 39, change "means" to --device--.
            line 48, change "." to --,--.

Col. 20,    line 5, change "means" to --device--.

Signed and Sealed this

Twentieth Day of February, 2001

Attest:

NICHOLAS P. GODICI

Attesting Officer    Acting Director of the United States Patent and Trademark Office